March 2, 1971 B. G. ALTMANN ET AL 3,567,399
WASTE COMBUSTION AFTERBURNER
Filed June 3, 1968
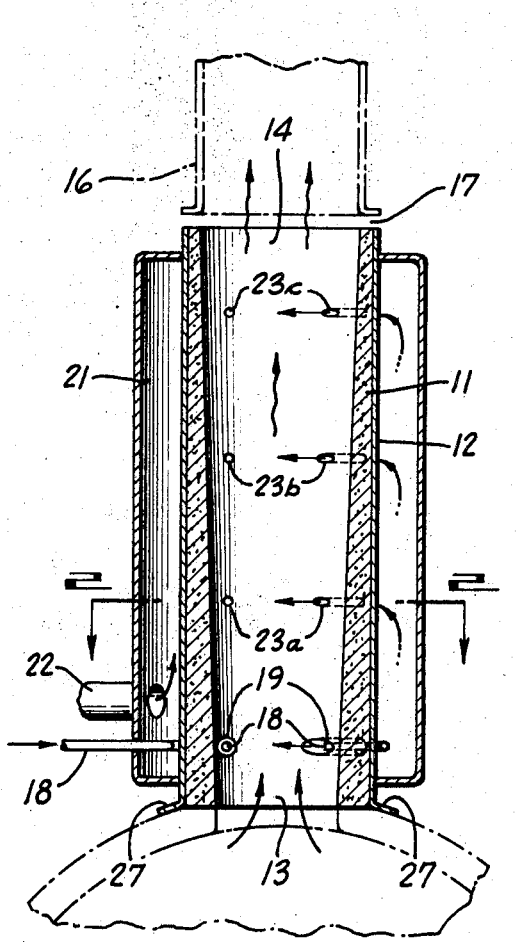
FIG_1
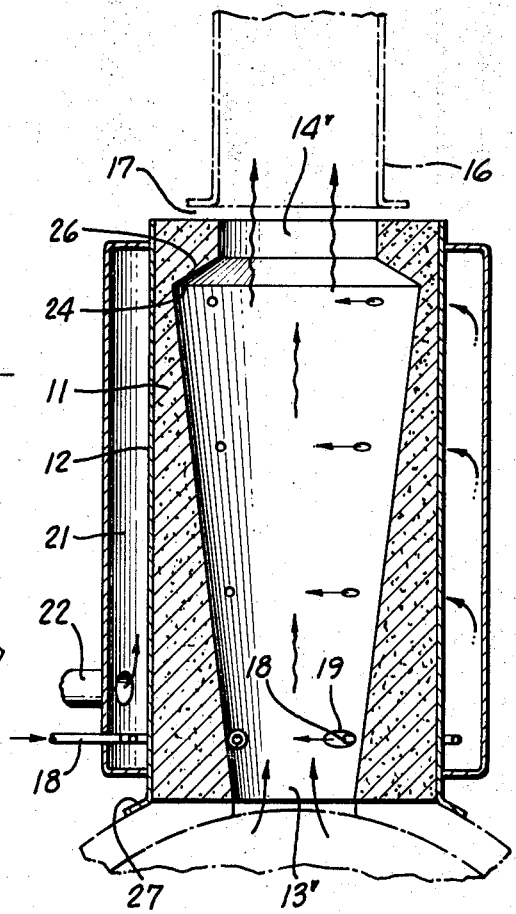
FIG_3
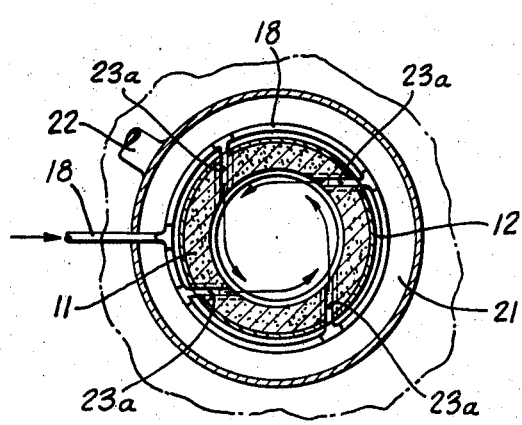
FIG_2
BERTON G. ALTMANN &
JOHN D. BAILEY
INVENTORS
BY
ATTORNEY

3,567,399
WASTE COMBUSTION AFTERBURNER
Berton G. Altmann, Los Gatos, and John D. Bailey, San Jose, Calif., assignors to Kaiser Aluminum & Chemical Corporation, Oakland, Calif.
Filed June 3, 1968, Ser. No. 733,919
Int. Cl. F23c 9/04
U.S. Cl. 23—277                                      3 Claims

ABSTRACT OF THE DISCLOSURE

An afterburner for oxidizing gaseous wastes comprises an elongated, frustoconical refractory chamber of increasing internal cross-sectional area from entrance to exit. Near the entrance end, heat is introduced into the chamber to raise the temperature of the gaseous waste products to the point where they will spontaneously oxidize when mixed with fluent oxidizer. The fluent oxidizer (e.g., air) is introduced in spaced sequential fashion along the length of the chamber.

BACKGROUND OF THE INVENTION

This invention concerns an afterburner suitable for consuming combustible gaseous waste products.

It has long been known to dispose of waste by burning it so as to produce a relatively large volume of gaseous combustion products and a relatively small volume of solid ash. It has also long been recognized that this method of disposing of waste can, if not properly conducted, result in pollution of the atmosphere by discharging into it solid-containing waste products (e.g., smoke) and other noxious substances.

One method which has been used in an attempt to overcome this problem is to gasify, or burn in a limited manner, solid waste material in a primary chamber, thus forming gaseous products of combustion which can be further oxidized. These gaseous waste products are then led directly to an afterburner wherein they are heated and further oxidized, e.g. by mixing with air, to form final products of combustion which are not objectionable from the point of view of air pollution.

One problem in waste combustion systems, and in afterburner systems in particular, is that the load on the system is usually quite variable, both as to volume of material to be processed and also as to its heat generating capacity, i.e., the amount of combustible material it contains. While it is relatively easy to construct a system which will efficiently dispose of waste material under constant operating conditions, it is much more difficult to construct a system which will consume widely varying amounts and types of waste without discharging objectionable products of combustion.

The afterburner of the present invention is designed to meet these needs.

SUMMARY OF THE INVENTION

It has now been found, according to this invention, that complete, efficient consumption of combustible gaseous waste products is achieved in an afterburner which comprises an elongated, generally frustonconical refractory chamber having an entrance end into which gases to be consumed are introduced, and an exit end from which consumed gases are exhausted, the refractory chamber progressively increasing in cross section from the entrance end to the exit end. Adjacent the entrance end of the chamber is located a heat producing means, for example a pilot light or gas burner or other means for heating the incoming gases. Thereafter, sequentially located along the refractory chamber, are selectively spaced means for introducing a fluent oxidizer, such as air, into the chamber whereby the heated gases can be oxidized to non-noxious products of combustion.

The means for introducing fluent oxidizer are preferably oriented so as to introduce the oxidizer chordally of the refractory chamber, thus imparting to the gases in the chamber a rotational motion and at the same time creating turbulence and good mixing between the oxidizer and the gases to be consumed. In a preferred embodiment, also, the ratio of the cross-sectional area of the entrance to the cross-sectional area of the exit is in proportion to the volume of the entrance and exit gases, respectively, taking into account both the thermal expansion of the gases in the chamber and also the volume of oxidizer gas introduced along the length of the chamber.

BRIEF DESCRIPTION OF THE DRAWINGS

FIG. 1 is a sectional elevation view of an afterburner according to this invention;

FIG. 2 is a sectional view taken along the line 2—2 of FIG. 1; and

FIG. 3 is a sectional elevation view similar to FIG. 1, but of an alternative embodiment of the invention.

It will be understood that the embodiments shown in the drawing and described hereafter are merely illustrative of the invention, the precise scope of which is defined by the claims.

DETAILED DESCRIPTION

In one embodiment, the afterburner comprises a refractory lining 11 within a cylindrical metal casing 12. At the lower end, as shown, the afterburner has an entrance 13 through which waste gases subject to further combustion are introduced and, at the upper end, an exit 14 through which fully oxidized gases are exhausted, either to the atmosphere or, if preferred and as shown in the drawing, to a stack 16 which can be constructed of metal, but which in any case comprises no essential part of the present invention. If desired, and as shown in the drawing, an annular opening 17 can be placed between exit 14 and stack 16 for the introduction of cooling air to the gaseous waste.

While the afterburner will most conventionally be used with entrance 13 at the bottom and exit 14 at the top, it will be understood that in certain applications other orientations may be feasible, for example a horizontal one wherein entrance and exit are on the same level and the gases travel horizontally through the afterburner.

Adjacent the entrance end of the afterburner is a means for introducing heat into the afterburner to heat the waste gases to their combustion temperature. As shown in FIG. 1, this means can comprise tubes 18 through which a gaseous fuel, for example natural gas, can be introduced to the afterburner chamber. Immediately surrounding tubes 18 are vents 19 through which fluent oxidizer, for example air, can be introduced. When the afterburner is in operation, tubes 18 and vents 19 form a burner which is ignited and which provides a means for heat input into the afterburner. Obviously, the means for introducing heat can take other forms, for example an oil burner or even an electric heating coil. Similarly, while it will generally be found most convenient to maintain this heat source in operation during the entire time the afterburner is in operation, it will be understood that if the waste gases entering the afterburner are sufficiently hot, then the heat source need be no more than a small pilot burner which will insure the ignition of these combustible gases when they are mixed with air or other fluent oxidizer.

Surrounding casing 12, and terminating short of its ends, is a plenum 21 to which air or other fluent oxidizer can be fed through conduit 22 from a source, for example a blower, not shown.

If desired, the amount of air fed to plenum 21 can be controlled in response to operating conditions in other parts of the incineration system, for example in response to the gas pressure in the main incineration chamber, wherein the gases fed to entrance 13 are generated. Such a system of control, which forms no part of the present invention, is disclosed in more detail in the copending patent application of one of the co-inventors of the present invention, said other application being entitled "Waste Combustion System" and having been filed concurrently with the present application.

From plenum 21, sets of air tubes 23 lead to the interior of the afterburner. It will be noted that plenum 21 also feeds air to vents 19 to supply air to the burner which generates heat at the bottom of the afterburner. Air tubes 23 can comprise several longitudinally spaced sets of a plurality of circumferentially spaced tubes. In FIG. 1, three longitudinally spaced sets, 23a, 23b, and 23c, each comprising four circumferentially spaced tubes, are shown.

As is shown most clearly in FIG. 2, air tubes 23 are disposed within refractory lining 11 so that the air input to the afterburner chamber is circumferential, most preferably chordal. In other words, as shown in the drawing, tubes 23 are disposed nonradially within the refractory. Thus, the jets of incoming air impart a rotational motion to the gases within the chamber and at the same time penetrate into the body of gas to create turbulence therein. Similarly, it is preferred that gas burner tubes 18 and associated air vents 19 also be directed through refractory lining 11 and into the combustion chamber so that the gas and air enter circumferentially.

If desired, gas tubes 18 and air vents 19, as well as tubes 23, can be tilted to a slight elevation above the horizontal so as to impart an upward motion to the gases in the chamber. However, this is not essential since the normal draft in the afterburner will cause longitudinal movement of the gases therethrough.

The afterburner of this invention can be attached, for example by bolts through flange 27, to the exit opening of the main combustion chamber of an incinerator wherein solid or semi-solid waste is gasified to combustible gaseous products, for example as is set forth in more detail in the copending application for "Waste Combustion System" referred to above.

It will be understood, however, that use of the afterburner of this invention is not confined to waste incineration systems. It can be used to consume other fluent combustible wastes, for example fumes from spray paint booths, chemical processes generating high organic content fumes, and the like.

The progressively expanding internal diameter of refractory lining 11 overcomes the buildup of back pressure in the afterburner due to thermal expansion of the gases therein upon combustion and consequent heating. The ratio of the area of exit 14 to that of entrance 13 will be such as to allow for the increased volume of gases leaving the afterburner, such increase being due to thermal expansion generation of gases by combustion, and the added oxidizer gas fed in through tubes 23. Although the actual dimensions of the chamber will depend on the results desired, an afterburner which worked well to consume 250 cubic feet per minute (standard temperature and pressure) of waste combustible gases with a B.t.u. content varying from 100 to 500 B.t.u.'s per cubic foot had an inlet diameter of 10", outlet diameter of 13", and was 60" long.

FIG. 3 shows an alternative embodiment of this invention wherein refractory lining 11 increases in diameter to a maximum at zone 24, which is adjacent to but short of exit 14'. Past zone 24, refractory lining 11 abruptly decreases in diameter to form a lip 26 adjacent exit 14'. The effect of lip 26, and the centrifugal forces generated as the gases pass over it, is to cause any small solid particles entrained in the gases to be deposited against refractory lining 11 in the neighborhood of zone 24. These small solid particles are then subjected to the action of hot oxidizing gases until they are entirely consumed and converted to gaseous products. This collection or retardation action of lip 26 acts to preclude emission of smoke or other particulate solid material from the afterburner.

Comparing the embodiment of FIG. 3 with that of FIG. 1, it should be noted that for a similar scale of operation, wherein entrance 13' is the same size as entrance 13, then exit 14' will be of the same size as exit 14. In other words, the inner diameter of refractory lining 11 at zone 24 in the embodiment of FIG. 3 is greater than the maximum inner diameter of refractory lining 11 in the embodiment of FIG. 1. In this way, the relationship of the size of entrance 13 to exit 14 is maintained in the embodiment of FIG. 3.

The first step in operating the afterburner will generally be to ignite or otherwise activate the source of heat adjacent entrance 13, the burner formed by gas tubes 18 and air vents 19, as shown in the drawing. This will have the effect of creating a draft within the afterburner and also within any associated apparatus, for example an incinerator. After the heat source is activated, combustible waste gases can be fed to entrance 13, for example by feeding waste to an associated incinerator and igniting it.

When a heavy load of combustible gases is fed to the afterburner, they will be brought to the ignition temperature, if they are not already at such temperature, by the heat source adjacent entrance 13. Thereafter, they will be admixed with air from tubes 23, whereupon they will be oxidized to nonnoxious gases. Simultaneously, any small solid particulate matter within the gases will also be oxidized to gaseous products of combustion. The completely oxidized gases will then pass from the afterburner through exit 14, either directly to the atmosphere or, as is shown in the drawing, to stack 16, where they can be cooled by heat exchange and by admixture with air drawn in through annular opening 17.

When a light load of combustible gases is fed to the afterburner, they will similarly be heated adjacent entrance 13 and oxidized upon mixing with air entering through the lowest set of vents 23a. Where the load is light, i.e. when the amount of combustible material in the gas is low, the air from the lowest set of tubes, 23a, may well be sufficient to completely oxidize it. Thereafter, the completely oxidized gases will be cooled by admixture with further air from the further sets of tubes, 23b and 23c, further along the afterburner.

Thus, it can be seen that efficient combustion of the fluent waste gases occurs under widely varying conditions of operation, i.e. widely different flow rates and widely different B.t.u contents.

What is claimed is:

1. In an afterburner adapted to oxidize solid-containing oxidizable fluent waste products, said afterburner comprising an elongated chamber having a first end, a second end, and a refractory lining disposed between said ends, said first end having an entrance opening adapted to receive said fluent waste products into said chamber, said second end having an exit opening adapted to exhaust oxidized fluent waste products, said chamber containing adjacent said first end means for heating said oxidizable waste products, and said refractory lining containing a plurality of tubular openings disposed in spaced relationship along the length of the chamber and adapted to the controlled introduction of fluent oxidizer into said chamber, the improvement wherein said chamber is generally frustoconical and of larger diameter adjacent the second end, and wherein said tubular openings are disposed within the refractory lining substantially in a plane perpendicular to the longitudinal axis of the elongated chamber and nonradially with respect to said longitudinal axis.

2. Afterburner according to claim 1 wherein the cross section of said chamber increases to a maximum adjacent the second end, said maximum being greater than the cross sectional area of the exit opening.

3. Afterburner according to claim 1 wherein said tubular openings comprise at least two longitudinally spaced sets of circumferentially spaced air inlets.

References Cited

UNITED STATES PATENTS

| | | | |
|---|---|---|---|
| 2,018,582 | 10/1935 | Theunissen | 431—352 |
| 2,072,731 | 3/1937 | Crosby | 431—352X |
| 2,157,265 | 5/1939 | Pathier et al. | 431—352X |
| 2,879,862 | 3/1959 | Burden, Jr. | 23—277-C |
| 2,973,191 | 2/1961 | Sackett, Jr. | 431—352X |
| 2,996,143 | 8/1961 | Beasley | 431—352X |

JAMES H. TAYMAN, Jr., Primary Examiner

U.S. Cl. X.R.

23—284, 2; 110—8; 431—5, 352